United States Patent
Iwaguchi et al.

(10) Patent No.: US 7,431,214 B2
(45) Date of Patent: Oct. 7, 2008

(54) BAR-CODE READER AND METHOD OF READING BAR CODE

(75) Inventors: Isao Iwaguchi, Tokyo (JP); Hideo Miyazawa, Tokyo (JP); Mitsuo Watanabe, Tokyo (JP); Kozo Yamazaki, Tokyo (JP); Masanori Ohkawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/751,885

(22) Filed: Jan. 7, 2004

(65) Prior Publication Data

US 2004/0164155 A1 Aug. 26, 2004

(30) Foreign Application Priority Data

Feb. 21, 2003 (JP) ............................. 2003-044988

(51) Int. Cl.
*G06K 5/04* (2006.01)

(52) U.S. Cl. .......................... 235/462.08; 235/462.16; 235/462.25

(58) Field of Classification Search ............ 235/462.01, 235/462.04, 462.08, 462.16, 462.24, 462.25
See application file for complete search history.

(56) References Cited

U.S. PATENT DOCUMENTS

| | | | | | |
|---|---|---|---|---|---|
| 4,147,295 A | * | 4/1979 | Nojiri et al. | ............ | 235/462.19 |
| 4,411,016 A | * | 10/1983 | Wakeland | ................... | 382/318 |
| 5,155,343 A | * | 10/1992 | Chandler et al. | ....... | 235/462.09 |
| 5,298,728 A | * | 3/1994 | Elliott et al. | ............ | 235/462.27 |
| 5,504,319 A | * | 4/1996 | Li et al. | ................. | 235/462.08 |
| 5,539,191 A | * | 7/1996 | Ackley | ................... | 235/462.26 |
| 5,719,384 A | * | 2/1998 | Ju et al. | .................... | 235/462.1 |
| 5,739,518 A | * | 4/1998 | Wang | ..................... | 235/462.09 |
| 5,790,715 A | * | 8/1998 | Iizuka | ........................ | 382/309 |
| 5,805,740 A | * | 9/1998 | Takagi et al. | ................ | 382/257 |
| 5,821,520 A | * | 10/1998 | Mulla et al. | ............. | 235/462.27 |
| 5,902,986 A | * | 5/1999 | Barkan et al. | .......... | 235/462.25 |
| 5,929,423 A | * | 7/1999 | Boersma et al. | ........ | 235/462.16 |
| 5,969,325 A | | 10/1999 | Hecht et al. | | |
| 6,015,089 A | | 1/2000 | Hecht et al. | | |
| 6,176,428 B1 | * | 1/2001 | Joseph et al. | ............ | 235/462.1 |
| 6,386,454 B2 | * | 5/2002 | Hecht et al. | ............ | 235/462.16 |

FOREIGN PATENT DOCUMENTS

| | | |
|---|---|---|
| JP | 9-160997 | 6/1997 |
| JP | 2000-507727 | 6/2000 |
| JP | 2000-251010 | 9/2000 |
| JP | 2000-353210 | 12/2000 |

OTHER PUBLICATIONS

Japanese Office Action mailed on Jan. 15, 2008 for counterpart Japanese application (Japanese Patent Application No. 2003/044988), with a partial English-language translation of the Japanese Office Action attached.

* cited by examiner

*Primary Examiner*—Ahshik Kim
(74) *Attorney, Agent, or Firm*—Kratz, Quintos & Hanson, LLP.

(57) ABSTRACT

A plurality of bar-code candidate areas are calculated from scan data that is acquired by scanning a bar code. Feature data, which represents a specific feature, is calculated for each of the bar-code candidate areas. The bar-code candidate areas are evaluated based on their feature data to thereby determine a bar-code candidate area that has the highest probability of being a bar code. The specific feature includes any one or more of length of a differential waveform, average energy, and number of peaks in the differential waveform.

12 Claims, 6 Drawing Sheets

BAR-CODE READER AND METHOD OF READING BAR CODE

BACKGROUND OF THE INVENTION

1) Field of the Invention

The present invention relates to a bar-code reader and a method of reading a bar code.

2) Description of the Related Art

Products are managed by providing a bar code to the product and identifying the product by reading this bar code optically. Since the bar code labels can be prepared at a low cost by printing etc., by using such bar code labels, it is possible to reduce the management cost substantially.

The bar-code labels attached to the products are read using a bar code reader. Such a bar code reader generally includes an optical system like a laser reader, a charged coupled device (CCD) camera etc. The bar code reader receives light that is reflected from a bar code label, determines a pattern of the white lines and the black lines in the bar code from the optical power of the light reflected, and then decodes this pattern to obtain character data that is a pattern of numerals and characters.

However, since scan data includes information even before and after the bar-code array, if the whole of the scan data is subjected to decoding, load during processing increases considerably. In other words, if a bar-code array can be extracted accurately from the scan data, load during processing can be decreased.

To extract the bar-code array from the scan data, one approach is to specify a starting position of a bar code in the scan data. This approach has been disclosed in Japanese Patent Application Laid-open Publication No. 2000-507727.

However, sometimes the scan data includes more than one areas with a high probability of being bar codes. Particularly, when there is a pattern like character string or mesh around the bar code, an area with a high probability that this character string or mesh pattern is a bar code, i.e. a bar-code candidate area, is extracted.

In conventional bar-code readers, when there area a plurality of such bar-code candidate areas, all the areas are decoded and a judgment of whether a bar-code candidate area is a bar code or not is made. However, this approach exerts considerable load on bar-code decoding, which results in decline in efficiency of reading.

SUMMARY OF THE INVENTION

It is an object of the present invention to solve at least the problems in the convenient technology.

A bar-code reader according to one aspect of the present invention includes an extracting unit that extracts, from a scan data obtained by optically scanning a bar code, a plurality of bar-code candidate areas that have a high probability of being a bar code; a feature-data calculating unit that determines feature data for each of the bar-code candidate areas based on a predetermined feature; and a priority-level determining unit that determines a priority, based on the feature data determined of each of the bar-code candidate areas, of the scan data of each of the bar-code candidate areas for performing decoding.

A method of reading a bar code according to another aspect of the present invention includes extracting, from a scan data obtained by optically scanning a bar code, a plurality of bar-code candidate areas that have a high probability of being a bar code; determining feature data for each of the bar-code candidate areas based on a predetermined feature; and determining a priority, based on the feature data determined of each of the bar-code candidate areas, of the scan data of each of the bar-code candidate areas for performing decoding.

The other objects, features and advantages of the present invention are specifically set forth in or will become apparent from the following detailed descriptions of the invention when read in conjunction with the accompanying drawings.

DETAILED DESCRIPTION

Exemplary embodiments of a bar-code reader and a method of reading the bar code according to the present invention are explained in detail below with reference to the accompanying diagrams.

Figure 1:
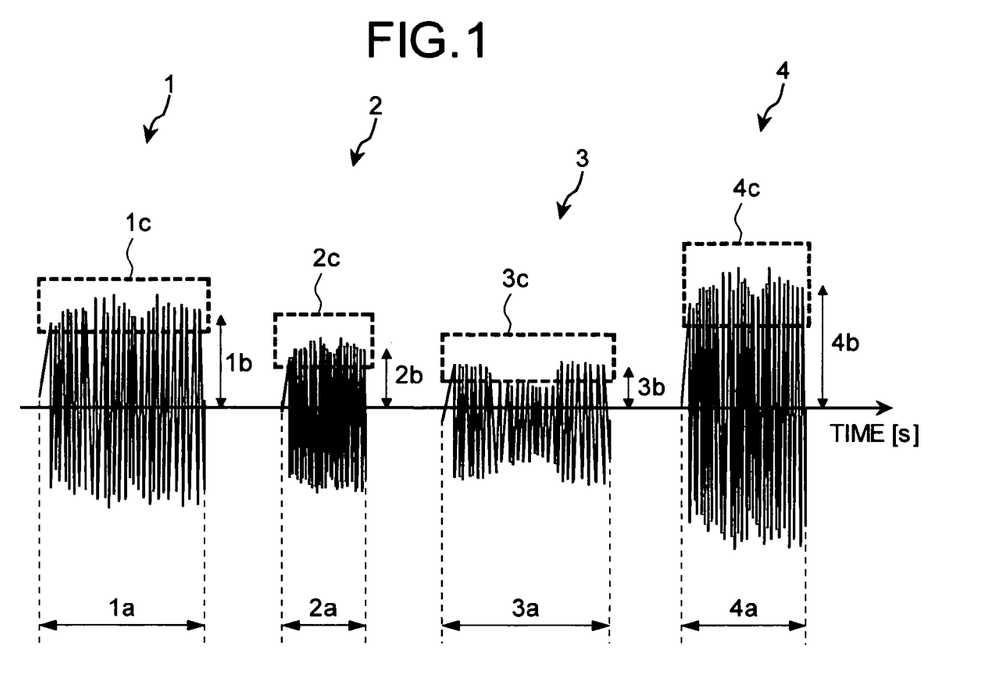
FIG. 1 is an illustration of a differential waveform of a scan data that includes a plurality of bar-code candidate areas.
Figure 2:
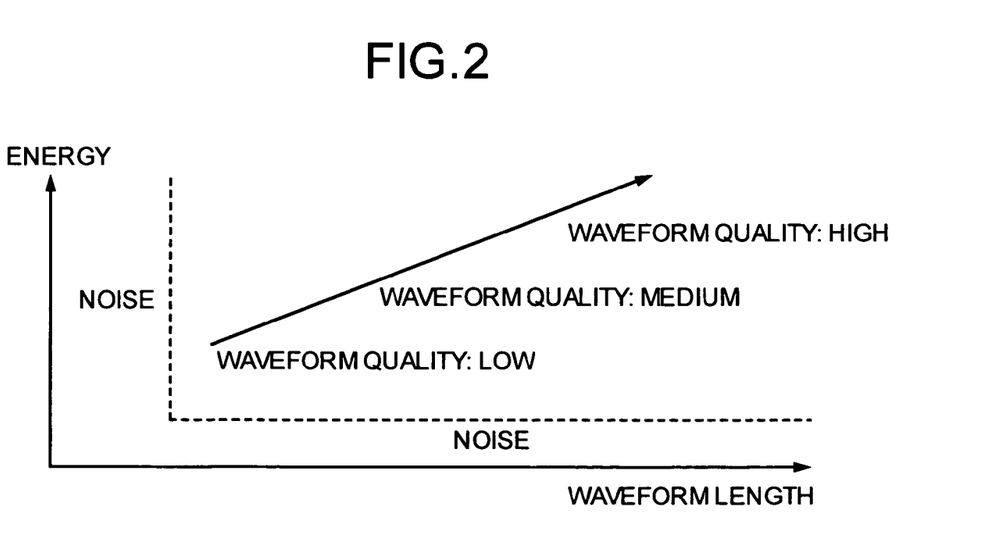
FIG. 2 is an illustration of a waveform length of bar-code candidate area and an amount of energy.

A concept of a method of reading a bar code related to the present invention is described with reference to FIG. 1 and FIG. 2. FIG. 1 is an illustration of a differential waveform of scan data that includes a plurality of bar-code candidate areas. The scan data includes bar-code candidate areas 1 to 4.

Feature data that characterizes respective bar-code candidate areas is calculated and priority level of decoding is determined by comparison of the feature data.

In other words, by comparison of the feature data, decoding is performed in a descending order of probability of being a bar code. The decoding performed in such order enables to decode an appropriate bar-code candidate area before decoding a bar-code candidate area that is extracted wrongly. Consequently, the time from bar-code scan up to the completion of reading, is shortened and decoding load is reduced.

Concretely, an average energy per time of each bar-code candidate area, a width of a bar-code candidate area, and number of peaks that have surpassed a predetermined threshold value etc. can be used as feature data for evaluating the bar-code candidate area.

The average energy of the bar-code candidate area can be calculated by differentiating the bar-code candidate area, squaring each amplitude value, adding the squared values together, and then dividing the sum by a time width of the bar-code candidate area, i.e. by a waveform length. Greater the amplitude of the bar-code candidate area, greater is the value of average energy per time. The average energy per time denotes a contrast ratio in an area that is scanned.

Referring to FIG. 1, when an average energy $1b$ of a bar-code candidate area 1, an average energy $2b$ of a bar-code candidate area 2, an average energy $3b$ of a bar-code candidate area 3, and an average energy $4b$ of a bar-code candidate area 4 are compared, the average energy $4b$ is the maximum, followed by the average energy $1b$, the average energy $2b$, and then the average energy $3b$.

Since these average energies correspond to the contrast of each bar-code candidate area respectively, with regard to the contrast, the bar-code candidate area 4 is the biggest area and the probability that this area is a bar code is high.

Moreover, width of a bar-code candidate area is a waveform length of the bar-code candidate area and corresponds to the length in the area that is scanned. When a waveform length $1a$ of the bar-code candidate area 1, a waveform length $2a$ of the bar-code candidate area 2, a waveform length $3a$ of the bar-code candidate area 3, and the waveform length $4a$ of the bar-code candidate area 4 are compared, the waveform length $3a$ is the maximum, followed by the waveform length $1a$, the waveform length $4a$, and then the waveform length $2a$.

Since these waveform lengths correspond to a length of each bar-code candidate area, with regard to the length of the bar-code candidate area, the bar-code candidate area 3 is the biggest area and the probability that this area is a bar code, can be said to high.

Moreover, by counting the number of peaks that have surpassed the predetermined threshold value from among differential waveforms of a bar code, it is possible to evaluate how long the pattern that has a contrast ratio not less than the predetermined ratio, continues. When a number of peaks $1c$ of the bar-code candidate area 1, a number of peaks $2c$ of the bar-code candidate area 2, a number of peaks $3c$ of the bar-code candidate area 3, and a number of peaks $4c$ of a bar-code candidate area 4 are compared, the number of peaks $1c$ is the maximum, followed by the number of peaks $3c$, the number of peaks $4c$, and then the number of peaks $2c$.

In other words, when the numbers of peaks are compared, the probability that the bar-code candidate area 1 is a bar code can be said to be high. The threshold value that is used while calculating the number of peaks may be the same in all the bar-code candidate areas or may be set separately for each bar-code candidate area.

Thus, by using the waveform length, the average energy, and the number of peaks etc., it is possible to evaluate for which area among a plurality of bar-code candidate areas, the probability of being a bar code is high. Since a bar code is formed by a repetitive array of black lines and white lines, the waveform of the reflected light has a long waveform length and high energy. Therefore, as it is shown in FIG. 2, longer the waveform length and higher the energy, better is the waveform quality and higher is the probability of being a bar code.

Therefore, the quality-evaluation value of each bar code is calculated from the waveform length, the energy, and the number of peaks. By using the quality-evaluation value as feature data, the bar-code candidate areas can be compared comprehensively and the priority level of the processing can be determined.

Figure 3:
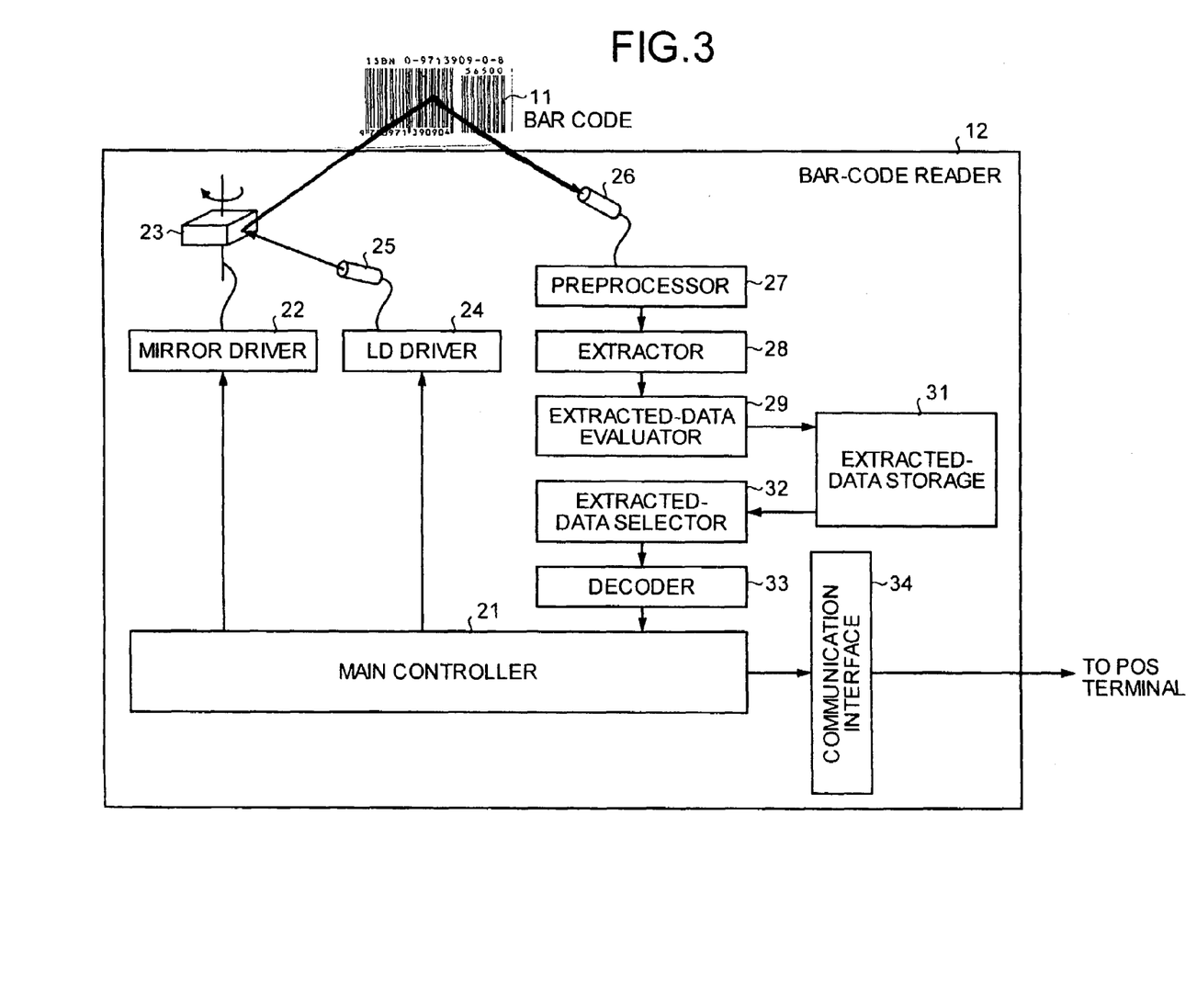
FIG. 3 is a schematic diagram of a bar-code reader according to an embodiment of the present invention.

FIG. 3 is a schematic diagram of the bar-code reader according to an embodiment of the present invention. A bar-code reader 12 includes a main controller 21, a mirror driver 22, a polygon mirror 23, a laser diode (LD) 25, an LD driver 24, a photodiode 26, a preprocessor 27, an extractor 28, an extracted-data evaluator 29, an extracted-data storage 31, an extracted-data selector 32, a decoder 33, and a communication interface 34.

The main controller 21 controls the bar-code reader 12. Concretely, the main controller 21 controls the mirror driver 22 and the LD driver 24 and scans a bar code 11. The main controller 21 also transmits character data that is received from the decoder 30 to a POS terminal via the communication interface 31.

The mirror driver 22 receives a control signal from the main controller 21 and rotates the polygon mirror 23. The LD driver 24 receives a control signal from the main controller 21 and emits a laser beam by operating the LD 25.

The laser beam that is emitted by the LD 25 is reflected from the polygon mirror 23 and is irradiated on the bar code 11. An irradiating position of the laser beam on the bar code 11 is changed by the rotation of the polygon mirror 23, thereby realizing scan of the bar code 11.

Figure 4:
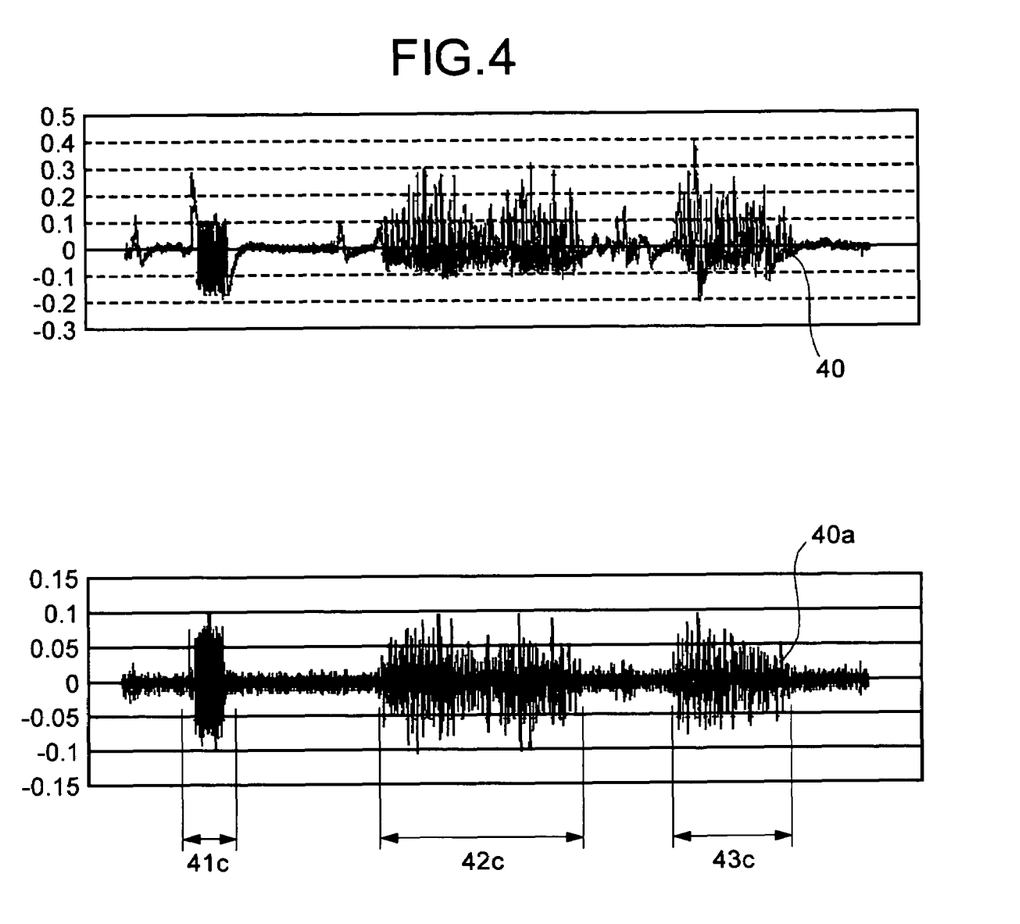
FIG. 4 is an illustration of a concrete example of scan data and differential scan data.

On the other hand, the laser beam that is reflected from a bar code 11 is converted to an electric signal by the photodiode 26. The preprocessor 27 amplifies the electric signal and converts it to a digital signal, thereby creating scan data 40 that is shown in FIG. 4. The preprocessor, then, transmits the scan data 40 to the extractor 28.

The extractor 28 calculates a differential of the scan data 40 and to thereby create differential scan data $40a$ (see FIG. 4). The extractor 28 extracts a bar-code candidate area from the differential scan data $40a$ and transmits it to the extracted-data evaluator 29. For example, the extractor 28 extracts data $41c$, $42c$, and $43c$ (hereinafter, "extracted data") (see FIG. 4) from the differential scan data $40a$.

The extracted-data evaluator 29 calculates feature data corresponding to the extracted data $41c$, $42c$, and $43c$, and based on the feature data, calculates an evaluation value that indicates the probability of the extracted data being a bar code. Concretely, the extracted-data evaluator 29 calculates the average energy, the waveform length, and the number of peaks as feature data of the extracted data $41c$, $42c$, and $43c$ respectively, and calculates the evaluation value by a function that has the energy, the waveform length, and the number of peaks as parameters.

The extracted-data evaluator 29 adds the evaluation value that is calculated, to the extracted data and writes it in the extracted-data storage 31. Moreover, the extracted-data evaluator 29 writes a number of samples extracted together, in addition to the extracted data and the evaluation result. The number of samples extracted is a sampling number at the time of analog to digital (hereinafter, "A/D") conversion that is included in the extracted data and is data that is used with the extracted data in bar-code decoding.

Figure 5:
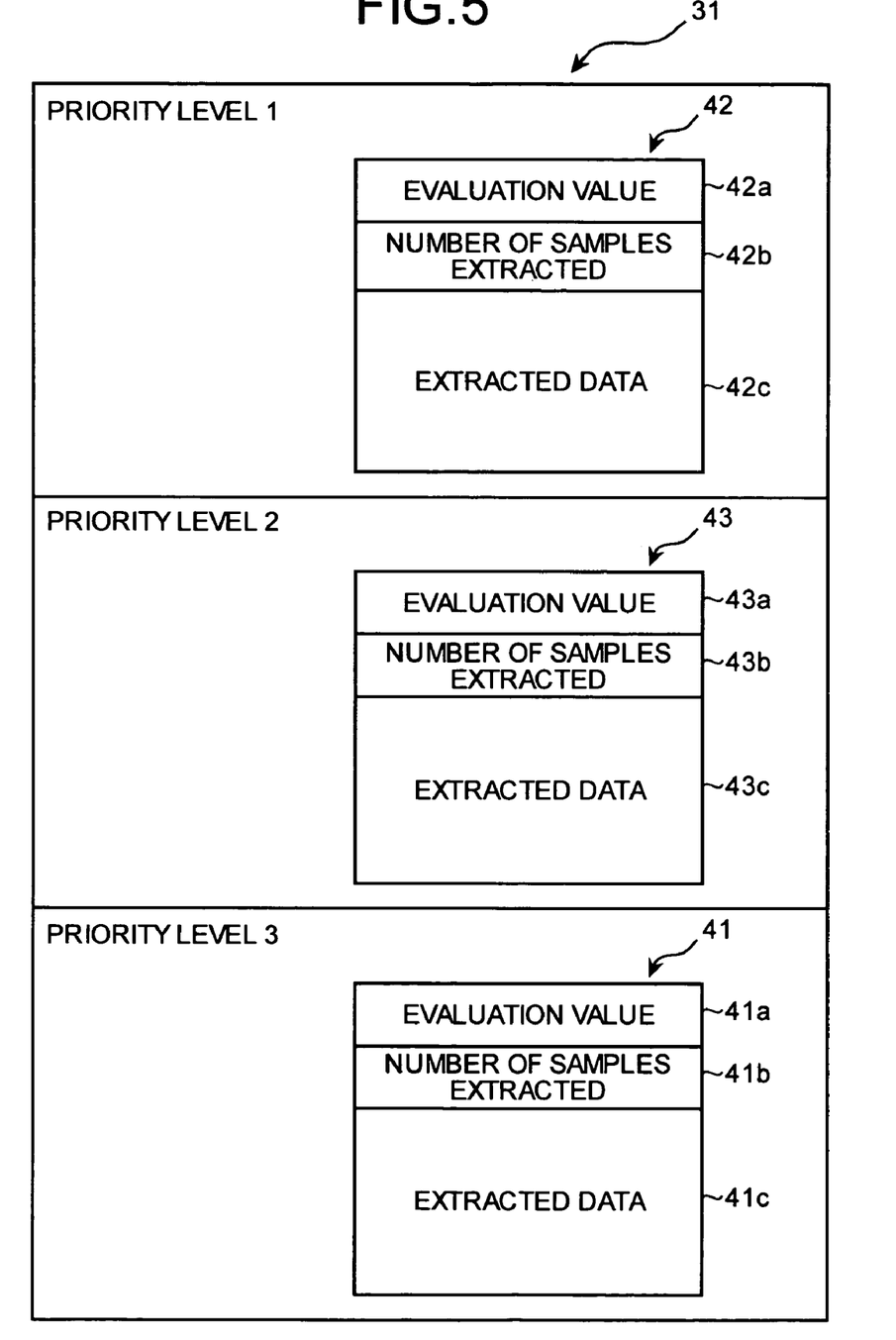
FIG. 5 is an illustration of data stored in an extracted-data storage.

In other words, the extracted-data storage 31 stores the evaluation value, the number of samples extracted, and the extracted data for each bar-code candidate area. Moreover, the extracted-data storage 31 stores the bar-code candidate areas according to the priority level of the bar-code decoding, based on the evaluation value of each bar-code candidate area as shown in FIG. 5.

Concretely, the extracted-data storage 31 sets a bar-code candidate area 42 in a priority level 1 and stores an evaluation value $42a$, number of samples extracted $42b$, and extracted data $42c$ of the bar-code candidate area 42. Moreover, the extracted-data storage 31 sets a bar-code candidate area 43 in a priority level 2 and stores an evaluation value $43a$, number of samples extracted $43b$, and extracted data $43c$ of the bar-code candidate area 43. Furthermore, the extracted-data storage 31 sets a bar-code candidate area 41 in a priority level 3 and stores an evaluation value $41a$, number of samples extracted $41b$, and extracted data $41c$ of the bar-code candidate area 41.

The extracted-data selector 32 reads out the bar-code candidate areas in an ascending order of the priority levels from the extracted-data storage 31 and transmits the extracted data and the number of samples extracted to the decoder 33.

The decoder 33 decodes a bar code by using the extracted data and the number of samples extracted that are received from the extracted-data selector 32, creates character data that is an array of numerals and alphabets, and transmits it to the main controller 21.

In this case, the decoder 33 receives the extracted data and the number of samples extracted in a descending order of the evaluation value, i.e. in a descending order of the probability of being a bar code. Therefore, it is possible to decode an appropriate bar-code candidate area before decoding data that is wrongly extracted. This enables to shorten the time up to the completion of the bar-code reading and to reduce the processing load.

The main controller 21 transmits the character data that is received from the decoder 33 to an external unit like a POS terminal via the communication interface 34, thereby outputting the reading result of the bar code 11.

Figure 6:
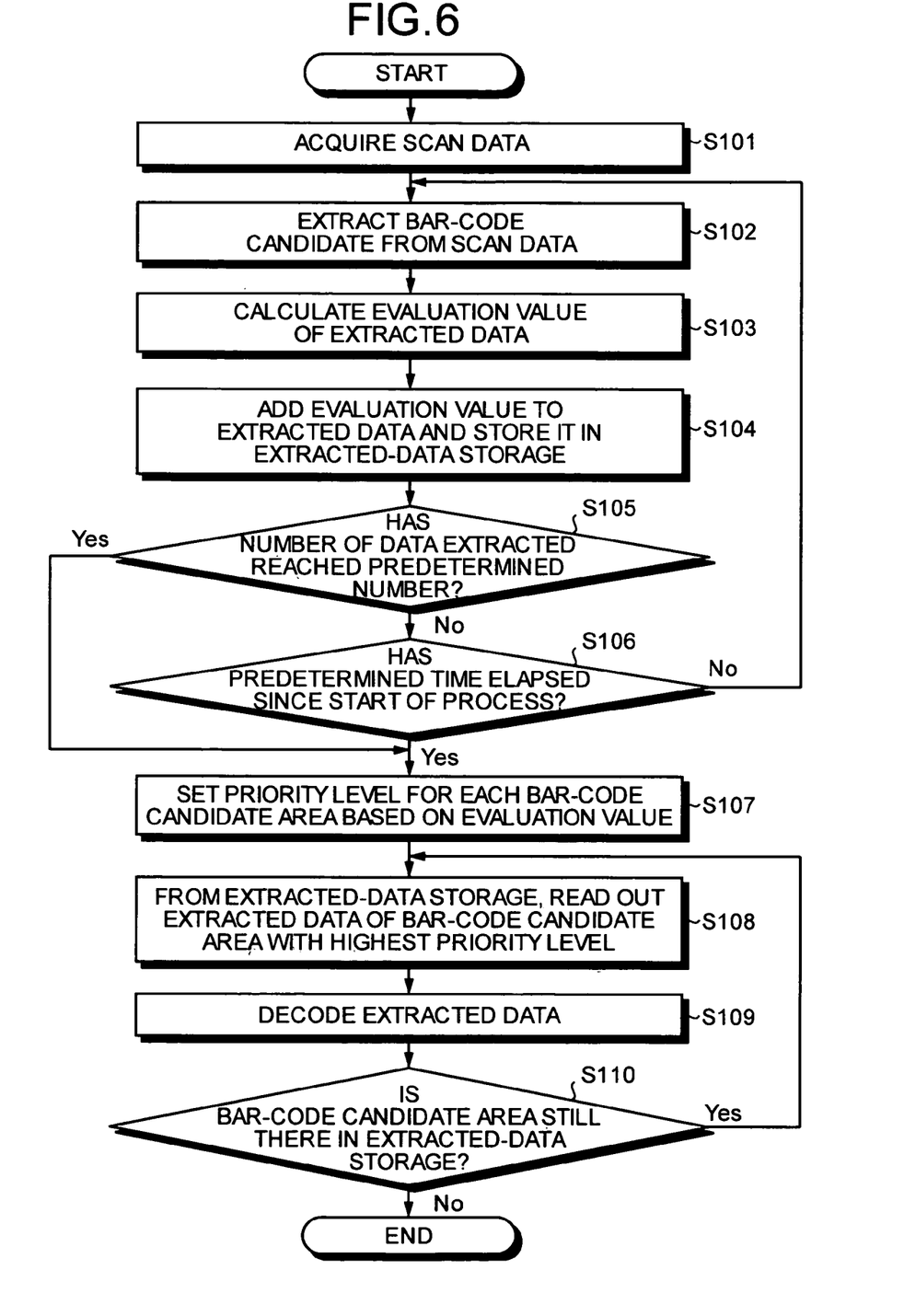
FIG. 6 is a flow chart of bar-code decoding process.

FIG. 6 is a flow chart of a bar-code decoding process in the bar-code reader 12. To start with, the bar-code reader 12 scans the bar code 11 by causing the combined operation of the LD 25 and the polygon mirror 23, and acquires scan data by the photodiode 26 (step S101).

Next, after the amplification and A/D conversion of the scan data by the preprocessor 27, the extractor 28 extracts bar-code candidate regions (step S102). Then, the extracted-data evaluator 29 calculates the evaluation value of the extracted data (step S103). The evaluation value is added to the extracted data and the resultant value is stored in the extracted-data storage 31 (step S104).

Further, a judgment of whether the number of the data extracted has reached the predetermined number or not is made (step S105). If the number of the data extracted has not reached the predetermined number (step S105, No), the bar-code reader 12 makes a judgment of whether the predetermined time has elapsed since the start of the process or not (step S106).

If the predetermined time has not elapsed since the start of the process (step S106, No), the bar-code reader 12 extracts the next bar-code candidate area from the scan data (step S102).

If the number of the data extracted reaches the predetermined number (step S105, Yes), or if the predetermined time has elapsed since the start of the process (step S106, Yes), the bar-code reader 12 sets the priority level based on the evaluation values of the bar-code candidate areas (step S107).

Further, the bar-code reader 12 reads out the extracted data of the bar-code candidate area for which the priority level is the highest, from the extracted-data storage (step S108) and decodes the extracted data that is read out (step S109). Then, the bar-code reader 12 makes a judgment of whether bar-code candidate areas are there or not in the extracted-data storage (step S110). If there are bar-code candidate areas (step S110, Yes), the bar-code reader 12 processes the extracted data of the bar-code candidate area that has the highest priority level among the bar-code candidate areas that are there (step S110).

Thus, the decoding is performed according to the priority level and when all the bar-code candidate areas are decoded (step S110, No), the bar-code reading ends.

The extracted-data storage 31 stores a fixed number of bar-code candidate areas, for example three bar-code candidate areas. In case of storing this fixed number of bar-code candidate areas, the extracted-data storage 31 stores three bar-code candidate areas in order of extraction of the area from the scan data. The extracted data storage 31 sets the priority level for these three bar-code priority areas and starts decoding.

However, when a large number of the bar-code candidate areas are extracted, an appropriate bar-code candidate area is not always there in the predetermined number of the bar-code candidate areas and three wrong bar-code candidate areas may be extracted from the scan data. The bar-code candidate areas are stored in the order of extraction and the three bar-code candidate areas are decoded upon assigning the priority level. If all the three bar-code candidate areas are wrong bar-code candidate areas, and if an appropriate bar-code candidate area is subsequent to the three wrong bar-code candidate areas, the appropriate bar-code candidate area is decoded after having decoded the three wrong bar-code candidate areas. This results in decline in the processing efficiency.

Therefore, if a new bar-code candidate area is extracted after storing a predetermined number of bar-code candidate areas in the extracted-data storage 31, the evaluation value of the new bar-code candidate area is compared with the evaluation values of the bar-code candidate areas that are already stored. If the evaluation value of the new bar-code candidate area is greater than the evaluation values of the bar-code candidate areas that are already stored, the bar-code candidate area that is stored in the extracted-data storage 31 is to be replaced. This enables to decode a bar-code candidate area that has a high probability of being a bar code, always on a priority basis, thereby preventing the decline in the processing efficiency.

Figure 7:
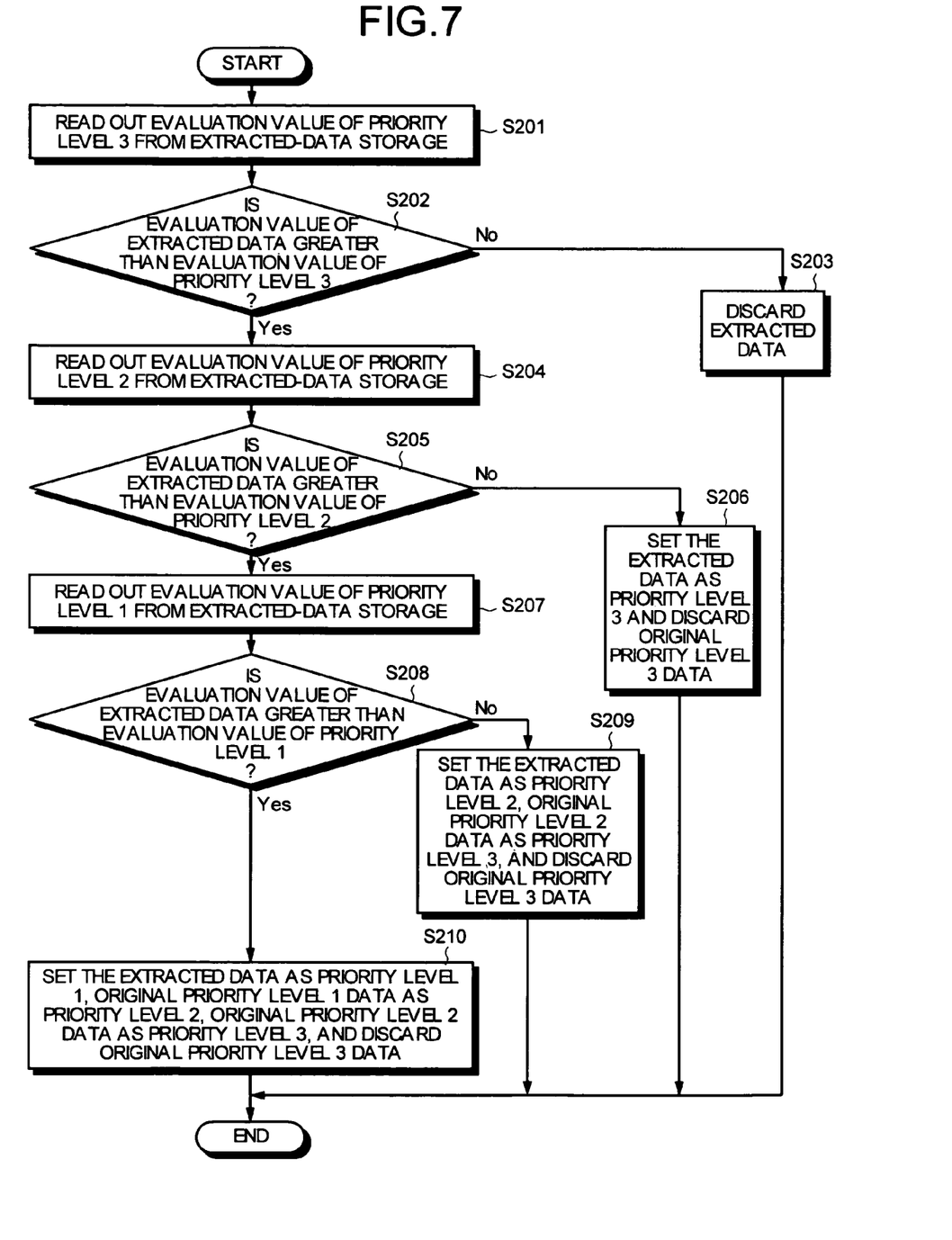
FIG. 7 is a flow chart of replacement operation of bar-code candidate area.

The replacement operation of the bar-code candidate area that is stored in the extracted-data storage 31 is described below by referring to FIG. 7. FIG. 7 is a flow chart of the replacement operation of the bar-code candidate area. When the extracted-data evaluator 29 calculates an evaluation value of the newly extracted bar-code candidate area, to start with, an evaluation value of the priority level 3 is read out from the extracted-data storage 31 (step S101) as shown in FIG. 7. Further, the extracted-data evaluator 29 compares the evaluation value of the newly extracted data and the evaluation value of the priority level 3 (step S202).

If the evaluation value of the newly extracted data is not greater than the evaluation value of the priority level 3 (step S202, No), the extracted-data evaluator 29 discards the newly extracted data (step S203).

On the other hand, if the evaluation value of the newly extracted data is greater than the evaluation value of the priority level 3 (step S202, Yes), the extracted-data evaluator 29 reads out the evaluation value of the priority level 2 (step S204). Further, the extracted-data evaluator 29 compares the evaluation value of the newly extracted data and an evaluation value of the priority level 2 (step S205).

If the evaluation value of the newly extracted data is not greater than the evaluation value of the priority level 2 (step S205, No), the extracted-data evaluator 29 sets the newly extracted data as the priority level 3 and discards the data of the original priority level 3 (step S206).

On the other hand, if the evaluation value of the newly extracted data is greater than the evaluation value of the priority level 2 (step S205, Yes), the extracted-data evaluator 29 reads out an evaluation value of the priority level 1 (step S207). Further, the extracted-data evaluator 29 compares the evaluation value of the newly extracted data and the evaluation value of the priority level 1 (step S208).

If the evaluation value of the newly extracted data is not greater than the evaluation value of the priority level 1 (step S208, No), the extracted-data evaluator 29 sets the newly extracted data as the priority level 2, the data of the original priority level 2 as the priority level 3, and discards the data of the original priority level 3 (step S209).

On the other hand, if the evaluation value of the newly extracted data is greater than the evaluation value of the priority level 1 (step S208, Yes), the extracted-data evaluator 29 sets the newly extracted data as the priority level 1, the data of the original priority level 1 as the priority level 2, the data of the original priority level 2 as the priority level 3, and discards the data of the priority level 3 (step S210) and ends the process.

Thus, by replacing the bar-code candidate area that is stored in the extracted-data storage 31 based on the evaluation value, extracted data that has the highest probability of being a bar code can be stored irrespective of the number of the bar-code candidate areas that are stored or the number of the bar-code candidate areas that are extracted. Further, it is desirable to erase (delete) the content that is stored in the extracted-data storage 31 after it is shifted to the decoding. This is to prevent rejection of total new data by data of high quality in the past in a case of reading a bar-code candidate area of low quality after having read a bar-code candidate area of high quality in the past.

Following is the further description of the decoder 33. The decoder 33 converts the extracted data of a bar-code candidate area to character data. However, since the bar-code array is formed according to predetermined regulations, it is possible to make a judgment of whether the data was a bar-code or not from an array of characters. Normally, the bar-code that is included in the scan data is single. Therefore, when normal character data is obtained as a result of decoding of a bar-code candidate area, the subsequent bar-code candidate areas can be discarded without decoding. This enables to reduce further the load on decoding of a bar code.

Thus, the bar-code reader acquires the scan data 40 by scanning the bar code 11 and extracts a plurality of bar-code candidate areas from the acquired scan data 40. Further, the bar-code reader calculates the feature data that characterizes the respective bar-code candidate areas and determines the priority level of decoding from the feature data. Then, the bar-code reader performs decoding of a bar code according to the priority level. Due to this, a bar-code candidate area that has a high probability of being a bar code is processed on priority basis. This enables to shorten the time from the scanning of a bar code up to the completion of reading and reduce the decoding load.

Thus, according to the present invention, it becomes possible to accurately identify a bar code, and therefore, increase the efficiency of reading of a bar code.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader comprising:
   an extracting unit that extracts, from a differential waveform of scan data obtained by optically scanning a scanning area including a bar code, a plurality of extracted data each corresponding to a bar code candidate area that is likely to correspond to the bar code;
   a feature-data calculating unit that determines feature data indicating a plurality of features of each of the bar-code candidate areas, and calculates an evaluation value for the each of the bar-code candidate areas based on the feature data;
   a storage unit storing the plurality of extracted data and the evaluation values; and
   a decoding unit that starts decoding the plurality of extracted data from one of the plurality of extracted data having the highest evaluation value.

2. The bar-code reader according to claim 1, wherein the plurality of features include at least an average energy per time of the each of the bar code candidate areas.

3. The bar-code reader according to claim 1, wherein the plurality of features include at least a width of the each of the bar code candidate areas.

4. The bar-code reader according to claim 1, wherein the plurality of features include at least a number of peaks with a value higher than a predetermined threshold in the each of the bar code candidate areas.

5. The bar-code reader according to claim 1, wherein the storing unit stores the extracted data and the evaluation values for a predetermined number of bar code candidate areas.

6. The bar-code reader according to claim 5, wherein if the extracting unit extracts additional extracted data corresponding to an additional bar code candidate area after the storing unit has stored the extracted data and the evalutation values for the predetermined number of bar code candidate areas, the feature data calculating unit
   calculates an additional evaluation value for the additional bar-code candidate area,
   compares the additional evaluation value with at least one of the evaluation values stored in the storage unit, and
   discards the at least one of the evaluation values and the extracted data corresponding to the at least one of the evaluation values from the storing unit and the storing unit and the storing unit stores the additional evaluation value and the additional extracted data, if the additional evaluation value is higher than the at least one of the evaluation values.

7. A method of reading a bar code, comprising:
   extracting, from a differential waveform of scan data obtained by optically scanning a scanning area including a bar code, a plurality of extracted data each corresponding to a bar code candidate area that is likely to correspond to the bar code;
   determining feature data indicating a plurality of features of each of the bar-code candidate areas;
   calculating an evaluation value for the each of the bar-code candidate areas based on the feature data;
   storing the plurality of extracted data and the evaluation values; and
   starting decoding the plurality of extracted data from one of the plurality of extracted data having the highest evaluation value.

8. The method according to claim 7, wherein the plurality of features include at least an average energy per time of each of the bar code candidate areas.

9. The method according to claim 7, wherein the plurality of features include at least a width of the each of the bar code candidate areas.

10. The method according to claim 7, wherein the plurality of features include at least a number of peaks with a value higher than a predetermined threshold in the each of the bar code candidate areas.

11. The method according to claim 7, wherein the storing includes storing the extracted data and the evaluation values for predetermined number of bar code candidate areas.

12. The method according to claim 11, further comprising:
    extracting additional extracted data corresponding to an additional bar code candidate area after the extracted data and the evaluation values for the predetermined number of bar code candidate areas have been stored;
    calculating an additional evaluation value for the additional bar-code candidate area;
    comparing the additional evaluation value with at least one of the evaluation values stored; and
    discarding the at least one of the evaluation values and the extracted data corresponding to the at least one of the evaluation values and storing the additional evaluation value and the additional extracted data, if the additional evaluation value is higher than the at least one of the evaluation values.

* * * * *